(12) United States Patent
Tonga et al.

(10) Patent No.: US 7,811,079 B2
(45) Date of Patent: Oct. 12, 2010

(54) MOLD FOR A CONTAINER BLOW MOLDING MACHINE, COMPRISING A GROOVED MOLD BOTTOM

(75) Inventors: Jules Tonga, Octeville-sur-Mer (FR); Christophe Lamande, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 450 days.

(21) Appl. No.: 11/997,081

(22) PCT Filed: Jul. 28, 2005

(86) PCT No.: PCT/EP2005/009211

§ 371 (c)(1),
(2), (4) Date: Jan. 28, 2008

(87) PCT Pub. No.: WO2007/016959

PCT Pub. Date: Feb. 15, 2007

(65) Prior Publication Data

US 2009/0130246 A1    May 21, 2009

(51) Int. Cl.
*B29C 49/70* (2006.01)
(52) U.S. Cl. .................. 425/537; 425/437
(58) Field of Classification Search .......... 425/437, 425/537; 264/335
See application file for complete search history.

(56) References Cited

U.S. PATENT DOCUMENTS 2,699,198 A * 1/1955 Balzhiser ............. 425/437
3,316,594 A * 5/1967 Uldry et al. ............ 425/537
5,840,352 A * 11/1998 Shimizu et al. ......... 425/437
2004/0070119 A1* 4/2004 Fibbia et al. ........... 425/522
2005/0073077 A1* 4/2005 Whitley ............... 425/537

FOREIGN PATENT DOCUMENTS

| JP | 59-1226 A | 1/1984 |
| JP | 4-131220 A | 5/1992 |
| JP | 5-345350 A | 12/1993 |
| JP | 2000102970 A * | 4/2000 |
| JP | 2001-88202 A | 4/2001 |

OTHER PUBLICATIONS

Partial machine translation of JP-05345350-A dated Dec. 1993 obtained from the JPO website.*

* cited by examiner

*Primary Examiner*—Robert B Davis
(74) *Attorney, Agent, or Firm*—Sughrue Mion, PLLC

(57) ABSTRACT

Mold for a blow molding machine for manufacturing containers from parisons, the mold including a lateral wall and a mold bottom (7) together defining a cavity for receiving parison, the cavity being generally symmetrical with respect to a main axis, the mold bottom (7) being provided with a gas conduit (12) opening into the cavity for injecting into the same a pressurized gas in order to facilitate withdrawing of the blow molded container, wherein the mold further including a groove (16) provided on an internal face (15) of the mold bottom (7), the groove (16) extending along a closed contour around the main axis, and wherein the conduit (12) opens into the groove (16).

9 Claims, 3 Drawing Sheets

MOLD FOR A CONTAINER BLOW MOLDING MACHINE, COMPRISING A GROOVED MOLD BOTTOM

FIELD OF THE INVENTION

The invention relates to the blow molding of containers. More specifically, it relates to a mold for a machine for the manufacturing of containers by blow molding. The blow molding is achieved by introducing into the mold a parison (generally made of a thermoplastic material) which has previously been heated, and then blowing the parison in order to give it a target shape in the mold.

Such a mold comprises a lateral wall and a bottom which together define a cavity into which the parison is introduced.

BACKGROUND OF THE INVENTION

It is known in the art that the blow molding operations depend upon the future utilizations of the container. For example, should the container be filled with a hot liquid (e.g. with drinks such as tea, pasteurized fruit juice, etc.), it is necessary to heat the mold in order to subject the container to a thermal treatment during the blow molding, thereby making it resistant to thermal shocks which will occur during the filling. Such a blow molding and the corresponding container are called "HR" (heat resistant) in the common terminology.

One drawback of such a method is that, by the end of the blow molding, the bottom of the container, which is still soft because of the thermal treatment, tends so stick to the mold bottom.

To overcome this problem, it is known to provide the mold bottom with a conduit which opens in the cavity in order to inject pressurized air into the cavity by the end of the blowing, thereby helping separation of the container from the mold.

However, this is not enough to allow for a quick separation of the container. Furthermore, there is a risk that pressurized air leaves a mark on the still soft container bottom, thereby locally weakening the container. In addition, such a mark happens to be unaesthetic.

SUMMARY OF THE INVENTION

It is one object of the invention to overcome the above-mentioned problems, providing a mold the design of which further facilitates the withdrawing of the container by the end of the blow molding.

The invention therefore provides a mold for a blow molding machine for manufacturing containers from parisons, said mold comprising a lateral wall and a bottom together defining a cavity for receiving a parison, said cavity being generally symmetrical with respect to a main axis, said bottom being provided with a gas conduit opening into the cavity for providing the same with a pressurized gas in order to facilitate withdrawing of the blow molded container, wherein the mold further comprises a groove provided on an internal face of the mold bottom, said groove extending along a closed contour around the main axis, and wherein said conduit opens into said groove.

Accordingly, the injection of gas into the mold through the gas conduit by the end of the blow molding results, thanks to the groove, by a substantially uniform thrust exerted vertically on the container, which is thereby easily separated from the mold bottom. As a result, the container is quickly, and with no mark leaved on it, withdrawn from the mold.

According to one embodiment, the groove extends along a circular contour, which has a diameter comprised e.g. between 10 mm and 20 mm. Preferably, the groove has a depth less than 0.5 mm and is V-shaped in radial section. In addition, at the level of the internal face of the mold bottom, the groove has a width preferably less than 0.5 mm. Moreover, the gas conduit preferably has, at his junction with said groove, a diameter less than 1 mm.

According to one embodiment, the mold further comprises a piston mounted in the mold bottom along the main axis, said piston being movable between a retracted position in which it is flush with the internal face of the mold bottom, and a deployed position in which it projects outward from the mold bottom into the cavity, said groove extending around and at a distance from said piston.

In a preferred embodiment, the mold bottom is generally curved toward said cavity and has a series of recesses distributed around an apex centered on the main axis, the groove being provided in said apex.

The above and other objects and advantages of the invention will become apparent from the detailed description of preferred embodiments of the invention, considered in conjunction with the accompanying drawings.

DETAILED DESCRIPTION

Figure 1:
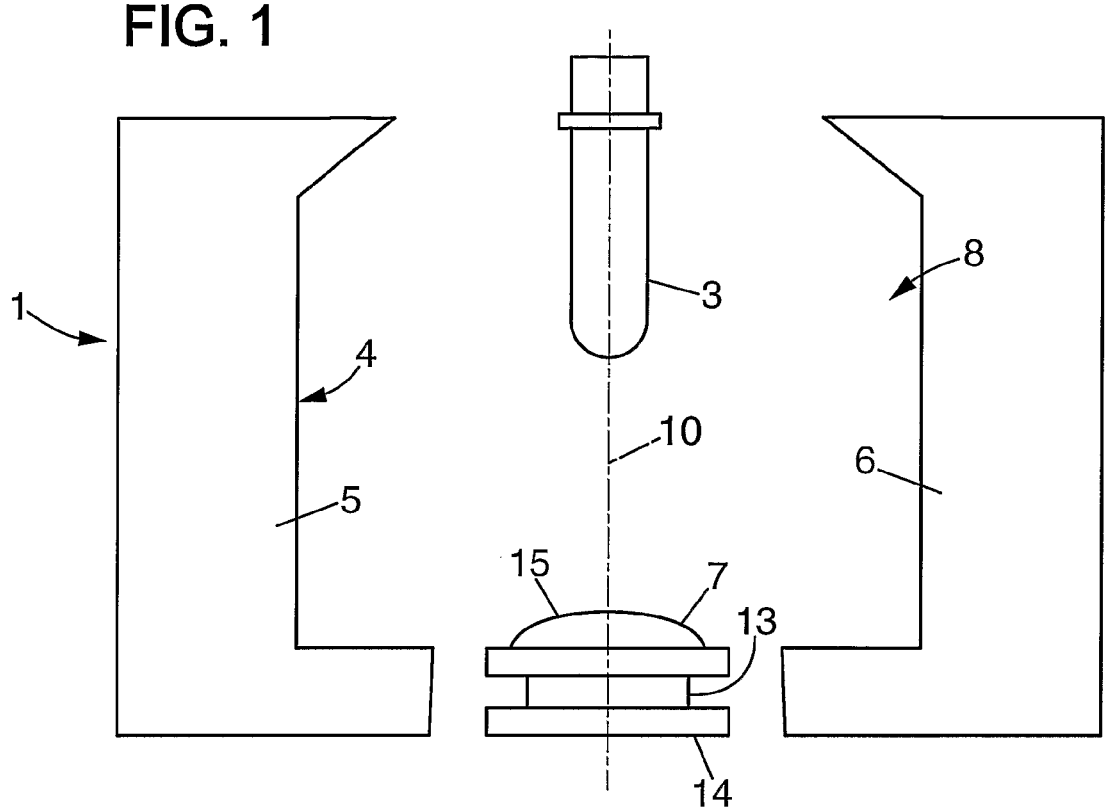
FIGS. 1 and 2 are schematic views showing blow molding operations of a container, starting from a parison.
Figure 2:
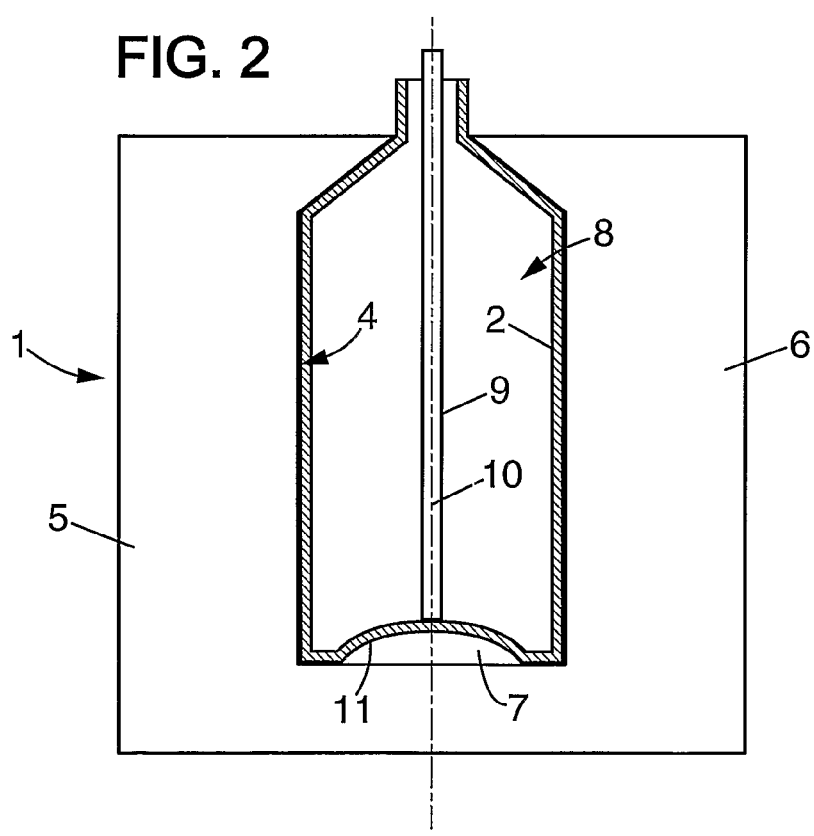

Referring now to FIGS. 1 and 2, there is shown a mold 1 for a blow molding machine (not shown) for manufacturing containers 2, starting from parisons 3 (here made of performs) in a thermoplastic material, e.g. PET.

The mold 1 has a lateral wall 4 comprised of two complementary half molds 5, 6 and a mold bottom 7. The half molds 5, 6 and the bottom 7 together define a cavity 8 in which the perform 3, after having been heated at a temperature around 120° C. (around 250° F.), is inserted while the mold 1 is open.

Mold 1 is closed, and the preform 3 is stretched and blow molded by means of a stretch-blow rod 9 provided with side holes through which a pressurized gas (e.g. air), at a pressure up to 40 bars (580 psi), is injected in the preform 3 to blow the same against the mold 1 into the shape of the final container 2.

The cavity is substantially revolution symmetrical around a main axis 10, the final container 2 having a substantially cylindrical shape.

The mold 1 is thereafter opened, the container 2 being withdrawn from the mold 1 to be either stored or immediately filled.

In order to facilitate withdrawal of the container 1 from the mold 2 and, more precisely, separation of the container bottom 11 from the mold bottom 7, a pressurized gas (e.g. air) is injected between the mold bottom 7 and the container bottom 11 while the mold 1 is opened.

To this end, the mold bottom 7 is provided with a gas conduit 12 for injecting pressurized gas into the cavity 8. The gas conduit 12 is comprised of three portions, i.e.:

a first portion 12a, extending vertically (i.e. parallel to the main axis) in the vicinity of a periphery 13 of the mold bottom 7, and opening on a lower face 14 of the mold bottom 7. A pressurized gas inlet (not shown) is connected to the first portion 12a;

a second portion 12b, inclined with respect to the main axis 10, having a diameter substantially equal to the diameter of the first portion 12a;

a third portion 12c, vertically extending in the vicinity of the main axis 10 and opening in the cavity 8 on an internal face 15 of the mold bottom 7. The third portion has a diameter lower than the diameter of the first and second portions 12a, 12b.

Figure 3:
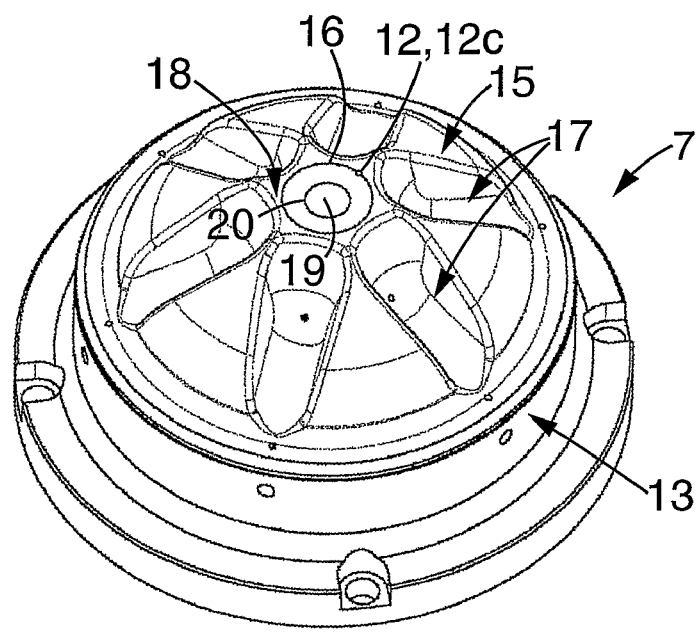
FIG. 3 is a perspective view showing the mold bottom.

As depicted on FIG. 3, the mold 1 has a groove 16, provided on the internal face 15 of the mold bottom 7, in which groove 16 the gas conduit 12 opens. Groove 16 extends along a closed contour around the main axis 10, whereby air injected through the conduit 12 flows and circulates into the groove 16, thereby permitting a substantially uniform separation of the container bottom 11 from the mold bottom 7.

The contour of the groove 16 may have loops (for example, it may be flower-shaped), for example in function of the shape of the mold bottom 7. In the depicted example, the contour of groove 16 is circular, thereby allowing for easy grinding of the groove 16 and quick circulation of the air flowing from the conduit 12.

Figure 5:
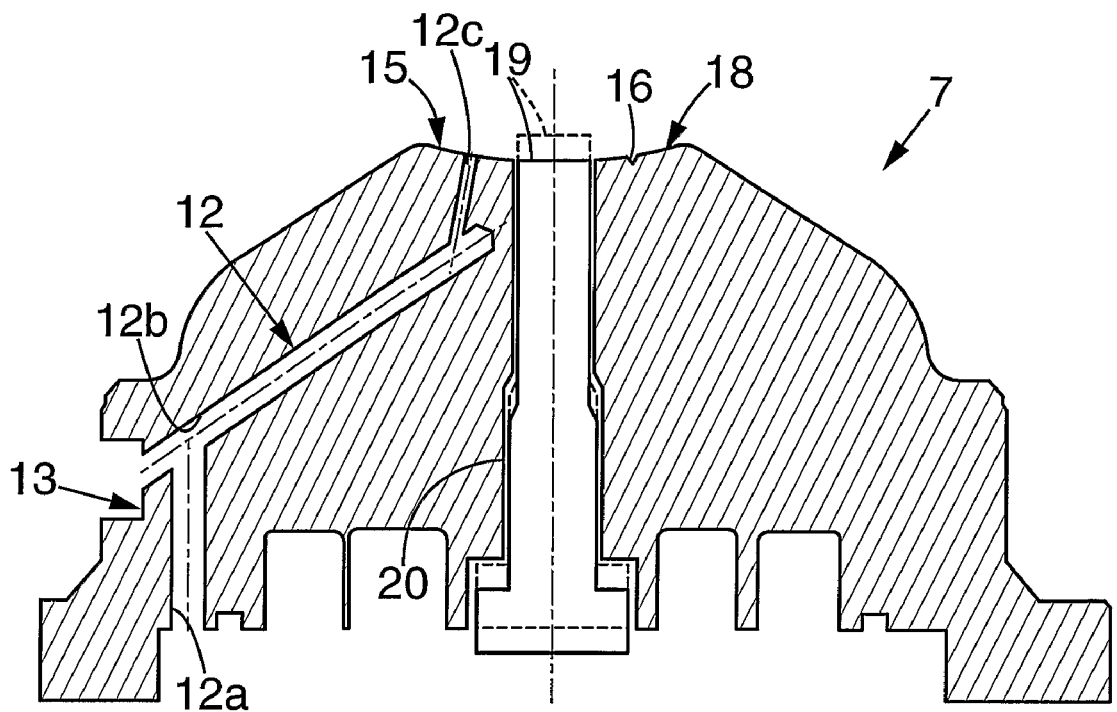
FIG. 5 is an elevational radial section view of the mold bottom.

As depicted on FIGS. 3 and 5, the mold bottom 7 is curved toward the cavity 8, thereby providing the container bottom 11 with a hollow shape enhancing its mechanical strength.

In the depicted example, the mold bottom 7 further comprises a series of recesses 17 distributed around an apex 18 centered on the main axis 10, thereby forming on the container bottom 11 bulbous stiffeners.

Figure 4:
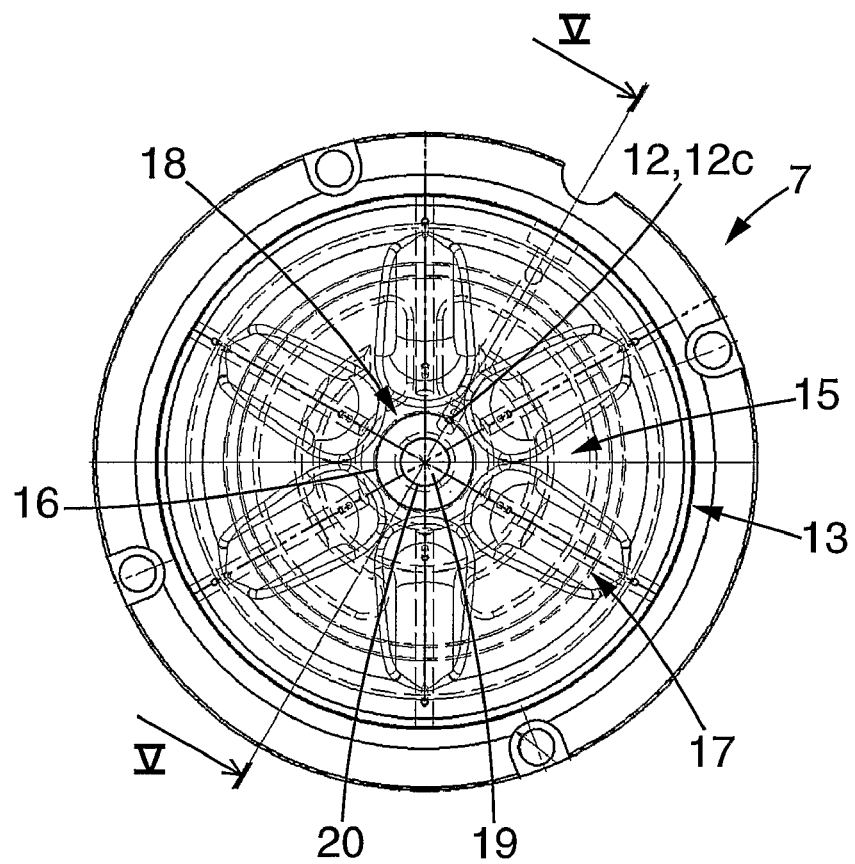
FIG. 4 is a top view showing the mold bottom.

As depicted on FIGS. 3-5, groove 16 is provided in the apex 18 without encroaching upon the recesses 17, in order for the pressurized air flow to be vertically oriented, thereby maximizing the separation force exerted on the container 2.

According to one embodiment, in which the container 2 has a diameter of 110 mm more or less, the contour of the groove 16 has a diameter comprised between 10 mm and 20 mm, e.g. of approximately 15 mm. Such values are sufficient to allow for an efficient separation of the container 2 from the mold bottom 7.

Figure 6:
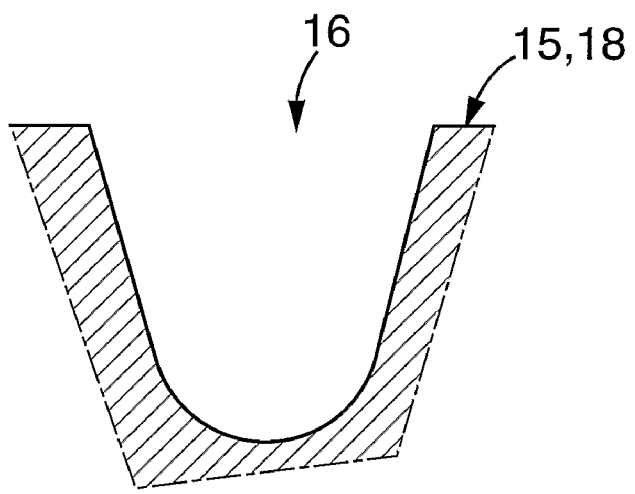
FIG. 6 is an enlarged elevational radial section view of the mold bottom.

As depicted on FIG. 6, in radial section, groove 16 is preferably V-shaped, possibly rounded at its bottom. Groove 16 has a depth preferably less than 0.5 mm, whereas at the level of the internal face 15 of the mold bottom 7 its width is preferably less than 0.5 mm. In addition, the conduit 12 preferably has, at its junction with the groove 16, a diameter less than 1 mm (in other words, the third portion 12c has a diameter of 1 mm).

As the thickness of the blown container is comprised between 0.2 and 0.3 mm, the shape and dimensions disclosed hereabove prevent the container material from flowing into the groove 16, or even into the conduit 12, during the blow molding. Accordingly, on the one hand, the container bottom 11 is not marked by the groove, and on the other hand air coming from the conduit 12 freely flows into, through and along the groove 16.

According to one depicted embodiment, the mold 1 further comprises a piston 19 mounted in a corresponding bore 20 formed in the mold bottom 7 and centered on the main axis 10.

Piston 19 is movable, with respect to the mold bottom 7, between a retracted position (in plain line on FIG. 5) in which it is flush with the internal face 15 of the mold bottom 7, and a deployed position (in dashed line on FIG. 5) in which it projects outward from the mold bottom 7 into the cavity 8.

For example, the piston 19 is pneumatically actuated during the mold opening. In its deployed position, the piston exerts on the container bottom 11 an upwardly oriented force, thereby adding a mechanical effect to the separation of the container 2 from the mold bottom 7.

The invention claimed is:

1. Mold (1) for a blow molding machine for manufacturing containers (2) from parisons (3), said mold (1) comprising a lateral wall (4) and a mold bottom (7) together defining a cavity (8) for receiving a parison (3), said cavity (8) being generally symmetrical with respect to a main axis (10), said mold bottom (7) being provided with a gas conduit (12) opening into the cavity (8) for injecting into the same a pressurized gas in order to facilitate withdrawing of the blow molded container (2), wherein the mold (1) further comprises a groove (16) provided on an internal face (15) of the mold bottom (7), said groove (16) extending along a closed contour around the main axis (10), and wherein said conduit (12) opens into said groove (16).

2. Mold (1) according to claim 1, wherein the groove (16) extends along a circular contour.

3. Mold (1) according to claim 2, wherein the contour of the groove (16) has a diameter comprised e.g. between 10 mm and 20 mm.

4. Mold (1) according to claim 1, wherein the groove (16) has a depth lower than 0.5 mm.

5. Mold (1) according to claim 1, wherein the groove (16) is V-shaped in radial section.

6. Mold (1) according to claim 1, wherein, at the level of the internal face (15) of the mold bottom (7), the groove (16) has a width lower than 0.5 mm.

7. Mold (1) according to claim 1, further comprising a piston (19) mounted in the mold bottom (7) along the main axis (10), wherein said piston (19) is movable between a retracted position in which it is flush with the internal face (15) of the mold bottom (7), and a deployed position in which it projects outward from the mold bottom (7) into the cavity (8), and wherein said groove, (16) extends around and at a distance from said piston (19).

8. Mold (1) according to claim 1, wherein the mold bottom (7) is generally curved toward said cavity (8) and has a series of recesses (17) distributed around an apex (18) centered on the main axis (10), and wherein said groove (16) is provided in said apex (18).

9. Mold (1) according to claim 1, wherein the gas conduit (12) has, at its junction with said groove (16), a diameter lower than 1 mm.

* * * * *